United States Patent [19]
Walker, Jr.

[11] Patent Number: 5,350,596
[45] Date of Patent: * Sep. 27, 1994

[54] METHOD OF CAPPING PARTICULATE MATERIALS

[75] Inventor: Daniel D. Walker, Jr., Henderson, Nev.

[73] Assignee: Chemical Lime Company, Fort Worth, Tex.

[*] Notice: The portion of the term of this patent subsequent to Jun. 2, 2009 has been disclaimed.

[21] Appl. No.: 988,300

[22] Filed: Dec. 8, 1992

[51] Int. Cl.$^5$ .............................................. B05D 7/00
[52] U.S. Cl. .................................. 427/154; 427/215; 427/421; 44/602; 252/88
[58] Field of Search .................. 427/215, 421, 154; 44/602; 252/88; 405/128

[56] References Cited
U.S. PATENT DOCUMENTS

| | | | |
|---|---|---|---|
| 3,634,302 | 1/1972 | Harnsberger | 260/32.8 R |
| 3,644,266 | 2/1972 | Harnsberger | 260/32.8 R |
| 3,720,640 | 3/1973 | Harnsberger | 260/336 R |
| 3,854,968 | 12/1974 | Minnick et al. | 106/109 |
| 4,264,333 | 4/1981 | Shaw et al. | 44/602 |
| 4,456,400 | 6/1984 | Heide et al. | 405/128 |
| 4,669,919 | 6/1987 | Hilterhaus et al. | 405/264 |
| 4,836,945 | 6/1989 | Kestner | 252/88 |
| 5,054,962 | 10/1991 | Bahnmuller et al. | 405/129 |
| 5,118,219 | 6/1992 | Walker, Jr. | 405/128 |
| 5,128,390 | 7/1992 | Murphey et al. | 523/130 |
| 5,141,362 | 8/1992 | Kügler | 405/128 |

*Primary Examiner*—Shrive Beck
*Assistant Examiner*—David M. Maiorana
*Attorney, Agent, or Firm*—Charles D. Gunter, Jr.

[57] ABSTRACT

A method and formulation are shown for capping dust-emitting bulk materials, such as materials being conveyed in open rail cars. A mineral formulation is prepared by mixing together lime, a pozzolanic component, a sulfate component, a fibrous component and water. The mineral formulation is applied to the surface of the dust-emitting bulk material and is allowed to harden to form a surface coating thereon.

10 Claims, 1 Drawing Sheet

METHOD OF CAPPING PARTICULATE MATERIALS

BACKGROUND OF THE INVENTION

1. Field of the Invention

The present invention relates generally to a method of capping particulate materials of the type having an exposed surface which tends to become airborne due to the influence of environmental factors. More specifically, the invention relates to a method for suppressing dust emissions from dust producing bulk materials, particularly during the transit of such materials.

2. Description of the Prior Art

There are a variety of circumstances in which environmental and economic concerns require capping particulate materials, such as dust producing bulk materials, having an exposed surface of particulate material of the type which tends to become airborne due to the influence of various environmental factors including wind and vibration. One example is the transportation of coal by open rail car. Coal cars travelling from the West to deliver low sulfur coal to Eastern utilities frequently lose between 2 to 5% by weight of their load through undesired dust emissions. Such dust emissions are increased by wind erosion and by the vibration of the rail car during transit.

While attempts have been made in the prior art to cap open rail cars containing dust-producing bulk materials, such caps have generally lacked the strength and structural integrity to perform adequately. In other cases, environmentally objectionable substances were utilized. Dust emissions produced by coal and other bulk materials during handling, storage, processing and utilization are undesirable from a variety of standpoints. Dust emissions from certain of these materials can constitute a health and safety hazard. As a result, dust from coal and other bulk materials must be controlled within defined limits, in many cases specified in federal, state or local laws.

In the area of chemical controls for dust emissions, additives are generally applied to an exposed surface of the bulk material in the form of a liquid spray or foam. U.S. Pat. No. 4,836,945, issued Jun. 6, 1989, to Kestner contains a detailed discussion of various prior art chemical controls including the use of water and oil sprays. Included among the prior art materials are aqueous solutions of vinyl esters, latex emulsions, asphalts, waxes and various other polymers. These prior art formulations have tended to be expensive and, in some cases, have included the use of environmentally objectionable components. Also, the teachings of the previously mentioned patents were apparently directed primarily toward stockpiles of such bulk materials, rather than toward the treatment of such materials during transit, as in an open rail car.

U.S. Pat. No. 5,118,219, entitled "Method of Capping Tailings Ponds", issued Jun. 2, 1992, to Daniel D. Walker, Jr. teaches a method for capping tailings ponds of the type which receive fines-containing aqueous effluent from an industrial process. A mineral formulation is prepared by mixing together lime, a pozzolanic component, a sulfate component and water. The mineral formulation is applied to the surface of the fines-containing tailings pond and is allowed to harden to form a surface coating on the tailings pond. The present invention is an improvement upon the previous formulation, specifically directed toward the capping of particulate materials being transported within a container having at least one opening therein which provides an exposed surface of the particulate material of the type which tends to become airborne due to the influence of environmental factors such as wind and vibration. The improved method of the invention has particular application to the transportation of coal and other dust-producing bulk materials such as, e.g., bulk hazardous waste soil being transported to a landfill, fly ash being transported to a waste dump and other particulate containing bulk materials such as iron ore. Particularly because of the effect of vibration upon the bulk material being transported, the requirements and characteristics of the present formulation differ from those described in the previously mentioned Walker patent. One factor of particular importance in the case of bulk transit is the compressive strength of the ultimately set cap.

The present invention has as its object to provide an environmentally acceptable, semipermeable, cementitious, non-hazardous, solid membrane designed to control dust emissions from bulk dust-producing materials.

Another object of the invention is to provide a capping material and method for controlling dust emission from open-air transport vehicles such as railroad cars carrying coal.

SUMMARY OF THE INVENTION

A method is shown for capping a particulate material having an exposed surface of the type which tends to become airborne due to the influence of environmental factors. An initially liquid slurry is prepared by mixing together lime, a pozzolanic component, a sulfur containing component, a fibrous component and water. The relative proportion of the ingredients used to formulate the slurry are selected to provide a product that, when hardened, possesses certain requisite compressive strength characteristics. The initially liquid slurry is applied to the exposed surface of the particulate material to be capped and is allowed to harden to a solid mass which substantially covers the exposed surface to be capped. Preferably, the liquid slurry is prepared by mixing together lime, fly ash, a sulfate component, a fibrous component and water.

The method of the invention is well adapted for capping a particulate material being transported within a container such as coal being transported within an open rail car where the particulate material has an exposed surface which tends to become airborne due to the influence of wind and vibration. An initially liquid slurry is prepared by mixing together a dry mineral formulation and water. The dry mineral formulation preferably comprises from about 15 to 25 weight percent lime, from about 45 to 60 weight percent fly ash, from about 25 to 35 weight percent gypsum and from about 1 to 2 weight percent fibrous material, all weight percents being based on the total dry weight of the mineral formulation. The mineral formulation is then mixed with water in a preferred ratio of about 1 to 4 and the liquid slurry is applied to the exposed surface of the particulate material contained within the rail car and allowed to harden. The hardened formulation has an unconfined compressive strength which is greater than about 600 psi and is preferably greater than about 1000 psi.

Additional objects, features and advantages will be apparent in the written description which follows.

DETAILED DESCRIPTION OF THE INVENTION

Figure 1:
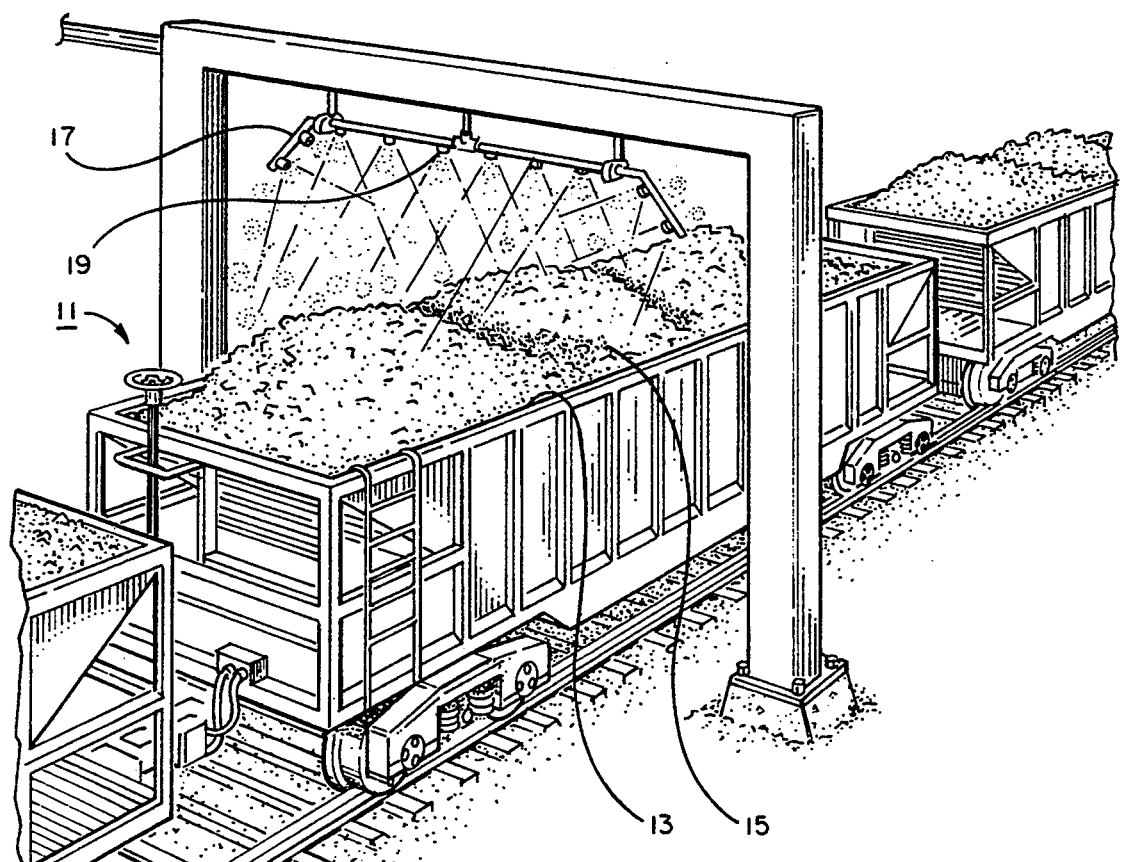
FIG. 1 is a perspective view, partially broken away of a series of rail cars passing through an application station showing the application of the mineral formulation of the invention.
Figure 2:
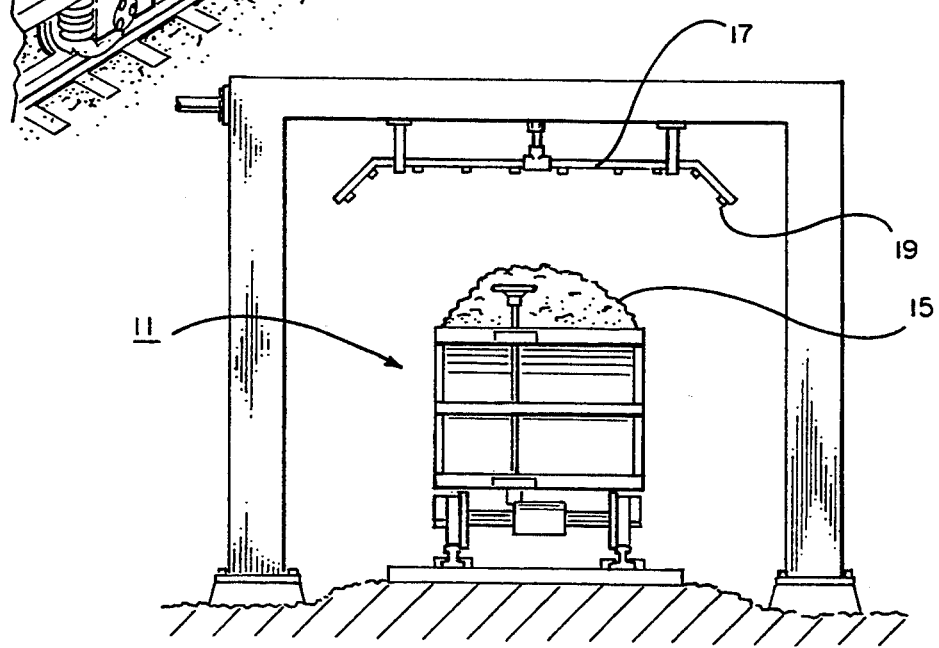
FIG. 2 is an end view of the application station of FIG. 1.

While the present invention has applicability to capping any bulk material having an exposed surface of the type having particulate material which tends to become airborne due to the influence of environmental factors such as wind and vibration, it is particularly effective in the case of materials being transported within a container having at least one opening therein. One such application is in the control of dust from open-air transport vehicles such as railroad cars carrying coal. In the practice of the method of the invention, a formulated material is prepared which forms a coating or capping material that can be easily applied to the exposed surface of particulate material to be capped. The formulated material is primarily a mineral formulation which is formed by mixing together lime, a pozzolanic component, a sulfate component, a fibrous component and water.

The lime component of the formulation is any reactive calcareous component containing calcium and/or magnesium oxide or hydroxide or other form of chemically combined calcium or magnesium which, under the conditions employed in the steps of the method, react with the other siliceous, aluminous and sulfur components of the formulations to form calcium, aluminous, sulfur, silica hydrates, i.e., ettringite and gypsum crystals. The preferred reactive calcareous component is high calcium quicklime. The high calcium quicklime, CaO, useful in the present invention has a CaO content of greater than about 90% by weight, preferably greater than about 95% by weight. The reactive calcareous component is preferably present in the dry formulation in the range from about 15 to 25% by weight, based on the weight of the total dry formulation.

The pozzolanic component of the mineral formulation is a reactive siliceous aluminous component which employed in the range from about 45 to 60% by weight of the total dry formulation. Such reactive siliceous-aluminous components include artificial or natural pozzolans, pulverized fuel ash (fly ash), granulated slag, pumice dust, ground silica, clay such as bentonite or kalonite, Portland cement kiln dust and others, as well as mixtures thereof having a pozzolanic character. By pozzolan is meant a finely divided material rich in silica or alumina which, while not necessarily cementitious in itself, will react at ordinary temperatures with hydrated lime in the presence of water to form a cementitious product. The preferred siliceous/aluminous component is fly ash. Fly ash is commercially available produce which will be familiar to those skilled in the art. It is obtained, for example, as a by-product of coal combustion.

The sulfur component of the formulation is any sulfur containing material which can react with the lime/fly ash to develop ettringite crystals in the mineral formulation. The sulfur component can conveniently be provided as gypsum or flue gas scrubber waste. Gypsum ($CaSO_2.2H_2O$) is a readily available mineral that need only be ground for use in the formulation of the invention. The gypsum is preferably ground to 100 percent $-20$ mesh or finer (i.e. dust). The sulfur component can also be provided as sulfuric acid. Sulfuric acid is commercially available from a variety of sources containing about 93–98% $H_2SO_4$; the remainder being water. The sulfur component of the formulation, when provided as gypsum, is present in the range from about 25 to 35% by weight based on the dry weight of the mineral formulation.

The mineral formulation also contains a fibrous component, such as shredded paper fiber, which is prepared by shredding waste paper. The fiber component is preferably present in the range from about 1 to 2% by weight, based on the total weight of dry formulation.

The remainder of the formulation is water which can be obtained from any convenient source. Water is present in an amount sufficient to produce a pumpable slurry. The water is preferably mixed with the dry mineral formulation on about a 4:1 ratio basis.

Particularly in the case of open-air transport vehicles, the capping formulation must meet certain requirements not present in land area applications. A rail car is constantly moving and vibrating during transit and a capping material must be strong enough to hold together under the resulting stresses.

In order to evaluate the toughness of the capping formulation of the invention, an unconfined compressive strength method was utilized. The test was conducted by making a paste of different mineral formulations. Nine sets of $2 \times 2$ cubes were made to determine compressive strengths of different mineral formulation mixes. The mixes were all blended to a consistency of 15 vicat, plus or minus 5 mm (according to ASTM standard consistency test method C 110). Three cubes were made of each blend and cured in a $2 \times 2$ mold for 24 hours at 120° F. The cubes were then placed in plastic bags and left to cure for a total of seven days at 120° F. The cubes were then removed from the curing oven, taken out of the plastic bags and allowed to cool for 4 hours at room temperature before determining compressive strengths. Table I below describes the formulation of the mixes in terms of the weight percentages of the dry mineral components. Table II shows the results of the compressive strength tests.

TABLE I

| Formula # | % of Lime | % of Gypsum | % of Flyash |
|---|---|---|---|
| 1 | 20 | 60 | 20 |
| 2 | 30 | 50 | 20 |
| 3 | 60 | 20 | 20 |
| 4 | 20 | 40 | 40 |
| 5 | 30 | 40 | 30 |
| 6 | 50 | 40 | 10 |
| 7 | 40 | 20 | 40 |
| 8 | 40 | 30 | 30 |
| 9 | 40 | 50 | 10 |

TABLE II

| Sample # | Cube #1 | Cube #2 | Cube #3 | Total | Avg. | PSI |
|---|---|---|---|---|---|---|
| 1 | 2750 | 2850 | 2350 | 7850 | 2616 | 654 |
| 2 | 3900 | 2500 | 3300 | 9870 | 3233 | 808 |
| 3 | 1050 | 1800 | 1600 | 4450 | 1483 | 370 |
| 4 | 5300 | 5600 | 4000 | 14930 | 4976 | 1244 |
| 5 | 2800 | 2450 | 3400 | 8650 | 2883 | 720 |
| 6 | 1050 | 600 | 850 | 2500 | 833 | 208 |
| 7 | 3200 | 3600 | 3300 | 10100 | 3366 | 841 |
| 8 | 2000 | 3200 | 2400 | 7600 | 2533 | 633 |

TABLE II-continued

| Sample # | Cube #1 | Cube #2 | Cube #3 | Total | Avg. | PSI |
|---|---|---|---|---|---|---|
| 9 | 500 | 750 | 750 | 2000 | 666 | 167 |

The preferred formulations of the invention, when cured, have a compressive strength greater than about 600 psi and are most preferably greater than about 1000 psi. A preferred dry formulation is shown below along with its measured compressive strength once mixed with water and cured according to the previous procedure:

| | |
|---|---|
| Quicklime (high calcium) | 20% |
| Gypsum | 30% |
| Fly Ash | 50% |
| Paper Fiber | 2% |
| Compressive Strength | 1410 psi |

The compressive strength of the formulations of the invention goes up rapidly for about two days and continues to gain strength for a week or more.

In practicing the method of the invention, the slurry formulated by mixing the dry mineral formulation with water is sprayed or spread over the surface to be treated. In the case of capping bulk materials for transit, the capping layer is preferably about 0.1 to 0.3 mm thick.

FIG. 1 shows a rail car, designated generally as 11, having an opening 13 therein which provides an exposed surface 15 of the particulate material of the type which tends to become airborne due to the influence of environmental factors such as wind and vibration. The material shown in FIG. 1 is coal but could, as easily, be iron ore or any other dust emitting bulk material. A spray bar 17 having nozzles 19 is mounted over the open rail car for spraying the slurry onto the exposed surface of particulate material as the car moves slowly beneath the bar. The slurry could also be applied by spreading on with a brush or through the use of commercially available hydromulching type equipment. Once the cap formed by the slurry has hardened, the bulk material can be transported without significant airborne dust emissions.

An invention has been provided with several advantages. The formulations of the invention provide an ideal capping material in control of dust from open-air transport vehicles such as railroad cars carrying bulk materials. The formulations of the invention are more durable than currently available treatments. The formulations of the invention are economical in practice in that low cost, widely available materials are primarily utilized in the formulations. The formulations consist of mineral type materials that will not degrade to environmentally unsafe substances.

While the invention has been shown in only one of its forms, it is not thus limited but is susceptible to various changes and modifications without departing from the spirit thereof.

What is claimed is:

1. A method of capping a particulate material being transported within a container having at least one opening therein which provides an exposed surface of the particulate material which tends to become airborne due to the influence of environmental factors including wind and vibration, the method comprising the steps of:

preparing an initially liquid slurry by mixing together lime, a pozzolanic component, a sulfur containing component, a fibrous component and water;

applying the initially liquid slurry to the exposed surface of the particulate material while the particulate material is located within the transport container; and allowing the initially liquid slurry to harden to a solid mass which substantially covers the exposed surface to be capped.

2. The method of claim 1, wherein the liquid slurry is prepared by mixing together lime, fly ash, a sulfate component, a fibrous component and water.

3. A method of capping a rail car containing a particulate material having an exposed surface which tends to become airborne due to the influence of environmental factors, the method comprising the steps of:

preparing an initially liquid slurry at a first location by mixing together lime, a pozzolanic component, a sulfur containing component, a fibrous component and water;

applying the initially liquid slurry to the exposed surface of the particulate material contained within the rail car; and allowing the initially liquid slurry to harden to a solid mass which substantially covers the exposed surface to be capped prior to transporting the particulate material to a second location.

4. The method of claim 3, wherein the initially liquid slurry is prepared by mixing together a dry mineral formulation and water, the dry mineral formulation comprising from about 15 to 25 weight percent lime, from about 45 to 60 weight percent fly ash, from about 25 to 35 weight percent gypsum and from about 1 to 2 weight percent fibrous material, all weight percents being based on the total dry weight of the mineral formulation.

5. The method of claim 4, wherein the ratio of dry formulation to water in the initially liquid slurry is about 1:4.

6. The method of claim 4, wherein the dried formulation has an unconfined compressive strength which is greater than about 600 psi.

7. The method of claim 6, wherein the dried formulation has an unconfined compressive strength which is greater than about 1000 psi.

8. A method of capping particulate material having an exposed surface which tends to become airborne due to the influence of environmental factors, the method comprising the steps of:

preparing an initially liquid slurry by mixing together lime, a pozzolanic component, a sulfur containing component, a fibrous component and water;

applying the initially liquid slurry to the exposed surface of the particulate material to be capped; and allowing the initially liquid slurry to harden to a solid mass which substantially covers the exposed surface to be capped, the solid mass having an unconfined compressive strength which is greater than about 600 psi.

9. The method of claim 8, wherein the liquid slurry is prepared by mixing together lime, fly ash, a sulfate component, a fibrous component and water.

10. The method of claim 9, wherein the liquid slurry is prepared by mixing together a dry mineral formulation and water, the dry mineral formulation comprising from about 15 to 25 weight percent lime, from about 45 to 60 weight percent fly ash, from about 25 to 35 weight percent gypsum and from about 1 to 2 weight percent fibrous material, all weight percents being based on the total dry weight of the mineral formulation.

* * * * *